United States Patent [19]

Bianchin et al.

[11] Patent Number: 5,223,193
[45] Date of Patent: Jun. 29, 1993

[54] PROCESS FOR PREPARING SHAPED BODIES WITH INTEGRATED POLYURETHANE SKIN, AND SHAPED BODIES OBTAINED BY SUCH PROCESS

[75] Inventors: Eugenio Bianchin, Treviso; Piero Andreola; Francesco Torre, both of Venice, all of Italy

[73] Assignee: ECP Enichem Polimeri s.r.l., Milan, Italy

[21] Appl. No.: 755,842

[22] Filed: Sep. 6, 1991

[30] Foreign Application Priority Data

Sep. 7, 1990 [IT] Italy ................. 21403 A/90

[51] Int. Cl.$^5$ ............................................. B29C 67/22
[52] U.S. Cl. ................. 264/45.7; 264/46.6; 264/255
[58] Field of Search ............ 264/45.7, 46.6, 45.1, 264/255, 45.5

[56] References Cited

U.S. PATENT DOCUMENTS

| | | | |
|---|---|---|---|
| 3,256,018 | 6/1966 | Baggenstoss | 264/46.6 |
| 3,391,823 | 7/1968 | Tijms | 264/311 |
| 3,547,747 | 12/1970 | Roberts | 264/302 |
| 3,923,937 | 12/1975 | Piccioli et al. | 264/46.9 |
| 4,042,663 | 8/1977 | Harder, Jr. | 264/46.6 |
| 4,285,903 | 8/1981 | Lemelson | 264/45.7 |
| 4,559,003 | 12/1985 | Poncet | 264/51 |
| 4,836,963 | 6/1989 | Gilman, Jr. | 264/45.7 |
| 4,855,096 | 8/1989 | Panaroni | 264/45.7 |
| 4,952,350 | 8/1990 | Duffy | 264/45.7 |
| 5,116,557 | 5/1992 | Debaes et al. | 264/255 |

FOREIGN PATENT DOCUMENTS

| | | | |
|---|---|---|---|
| 2340868 | 3/1975 | Fed. Rep. of Germany | 264/45.7 |
| 1514185 | 1/1968 | France . | |
| 49-028667 | 3/1974 | Japan | 264/45.7 |
| 55-150331 | 11/1980 | Japan | 264/45.7 |
| 7304815 | 10/1973 | Netherlands . | |

OTHER PUBLICATIONS

Chemical Abstracts, 68-08636Q, & FR-1-523-836, R. Scheibling, "Formation of Fault-Free Expanded Elastomeric Mouldings".

*Primary Examiner*—Allan R. Kuhns
*Attorney, Agent, or Firm*—Oblon, Spivak, McClelland, Maier & Neustadt

[57] ABSTRACT

Process for preparing shaped bodies with integrated polyurethane skin, which process comprises:
(a) charging to a closed mould for rotational moulding a first premixed reactive polyurethane system;
(b) causing the mould to rotate, according to rotational moulding technology, for a long enough time to form a thin layer of partially polymerised material on the inner surface of said mould; and
(c) discontinuing the rotation and charging to the mould a reactive material which will fill the inner mould hollow.

6 Claims, No Drawings

PROCESS FOR PREPARING SHAPED BODIES WITH INTEGRATED POLYURETHANE SKIN, AND SHAPED BODIES OBTAINED BY SUCH PROCESS

The present invention relates to a process for preparing shaped bodies with integrated polyurethane skin, and to the shaped bodies obtained by such a process.

More particularly, the present invention relates to a process for preparing shaped bodies of foamed polyurethane with an integrated skin of the same nature, and which does not necessarily require that foaming agents of chlorofluoroalkane nature are used.

By the term "shaped bodies", as used in the present disclosure and in the appended claims, those articles of manufacture are meant, which are made from polymers, preferably foamed polymers, and are coated by a thin layer of solid polyurethane. Components for car interiors, such as headrests, tunnel covers, dashboards, inner side panels for doors, steering wheel covers, ball grips for gearbox levers, and so forth, or saddles for cycles and motor-cycles, seats for furnishing or transportation means, arm rests for chairs and arm-chairs, cases for household electrical appliances or electronic apparatuses, boxes for electrical components, window frames, components for furnishing, and so forth, are examples of such articles of manufacture.

The technique for preparing manufactured articles of foamed polyurethane with integrated skin is by now well-known and firmly established by all those who operate on this sector.

According to this technique, a moulding compound constituted by polyurethane reactants admixed with a foaming agent, polymerization catalyst, and further additives as cell regulators, stabilizers, and so forth, is charged to a mould kept at a prefixed temperature.

The foaming agent is essentially constituted by chemical compounds belonging to the class of chlorofluoroalkanes (chlorofluorocarbons, CFC), having an evaporation/condensation temperature comprised within the range of from 20° to 60° C.

During the polymerization, the chlorofluorocarbons evaporate owing to the effect of reaction heat and act as foaming agents for the polyurethane resin. When the latter comes into contact with the "cold" walls of the mould, the chlorofluorocarbons condense due to the effects of temperature, and of the compression applied to said walls by the foamed resin. Therefore, that portion of polyurethane resin which is into contact with the walls of the mould, forms a compact layer.

The manufactured article which is discharged from the mould is hence constituted by an internal mass with cellular structure, coated, with total adhesion, by a skin with compact structure, the thickness of which is of a few millimeters at maximum.

Although it does not show any problems of technical nature, the above described method is characterized by the drawback that as the foaming agent a gas has to be used, which belongs to the class of chlorofluoroalkanes which, as well-known by now, have a noxious impact on our surrounding environment, in that they contribute to alter and destroy the ozone layer present in the stratosphere.

Because of international agreements aimed at promoting the progressive reduction in CFC's production, the impetus to develop techniques which make it possible these products to be replaced by other products, less noxious to the environment, is very strong.

The present Applicant has found now a process which makes it possible articles of manufacture constituted by foamed polymers with integrated skin to be prepared, which process is not based on the use of CFC's as necessary foaming agents.

Therefore, the object of the present invention is a process for preparing shaped bodies with integrated polyurethane skin, which process comprises:

(a) charging to a closed mould, suitable for rotational moulding, a first premixed reactive polyurethane system;

(b) causing the mould to rotate, according to the rotational moulding technology, for a long enough time to form a thin layer of partially polymerised material on the inner surface of said mould; and (c) discontinuing the rotation and charging to the mould a reactive material which will fill the inner mould hollow.

The rotational moulding is a well-known technique, described by E. Zuckmantel in Kunststoffe, vol. 63, October 1973, page 721, "Rotational Moulding".

According to a form of practical embodiment of the process according to the present invention, the thin layer formed during the rotation of the would has a thickness of less than 10 mm, and generally comprised within the range of from 0.3 to 3.5 mm.

The uniformity or the layer depends on the revolution speed (rpm) of the axes of the rotor on which the mould is installed, and on the rheology of the polyurethane system which constitutes said layer. In order to be able to achieve thin, uniform layers, it is preferable to operate with a revolution speed of the axes comprised within the range of from 10 to 50 revolutions per minute, and with a reactive polyurethane system having an initial viscosity lower than 5,000 mPa.s, and generally comprised within the range of from 50 to 1,000 mPa.s.

If necessary, the viscosity of the polyurethane system can be regulated by using viscosity depressant substances, such as, e.g., perchloroethylene, dibutyl adipates, cumene, and so forth.

After a relatively short rotation time, typically comprised within the range of from 30 to 300 seconds, during which the components of the layer begin to react in order to yield a partially polymerised urethanic polymers, the mould is stopped and the hollow of the mould is filled with a reactive material.

The reactive material used to fill the mould hollow is preferably constituted by a premixed, polyurethane reactive system capable of being converted into a cellular foam, as disclosed hereinunder, or by other materials, such as, e.g., phenolic resins, epoxy resins, poly(vinyl chloride) or poly(methyl methacrylate) based plastisols, and so forth, possibly admixed with foaming agents.

Also a filling material consisting of non-foamed polyurethane can be used as well.

In the process according to the present invention, any filling methods can be used; for example, the filling material can be injected into the sealed mould, or it can be cast into the mould while the latter is open, or, still, the preshaped skin shell can be removed from the mould, to be subsequently filled with the material outside of said mould.

In order to achieve a better adhesion between the inner component and the superficial component, thus accomplishing the "integrated skin"-article of manufacture as perfectly as possible, the feed of the second reactive system ("c" step) should be carried out when the polymerization degree of the polyurethanic layer has proceeded to such an extent that, on the one side, said layer shows already a dimensional stability of its own, and, on the other hand, still offers such chemical groups or physical characteristics, as to allow a more favorable bonding of the second material, which is being formed, to occur.

The polyurethane system of the thin layer is essentially constituted by a reactive mixture containing at least one organic polyisocyanate, at least one compound containing end-chain active hydrogen atoms, and a catalytic system for the reaction of polymerization.

The components of the polyurethane system capable of being converted into a cellular foam, which constitutes an example of an active filling material, can be the same as of, or different from, those of the thin skin layer, and furthermore comprise a foaming agent preferably constituted by carbon dioxide developed in situ during the polymerization caused by the reaction of the isocyanate group with water.

In the practicing of the process according to the present invention, the amounts of water which can be used in combination with the compound which contain end-chain active hydrogen atoms of the polyurethane system capable of being converted into a cellular foam depend on the foaming degree which one wishes to obtain. In general, these amounts are well-known by those who operate in this sector, and are comprised within the range of from 0.5 to 5 parts by weight relatively to 100 parts of the compound which contains end-chain active hydrogen atoms.

However, this method for introducing the foaming gas into the polymerization mass should not be understood as being limitative, in that other gases and other techniques may be used as well, such as, e.g., bubbling air, $CO_2$, nitrogen. etc., throughout the reaction mass by injecting these gases from the outside, under pressure. All these methods fall within the scope of the present invention.

Inasmuch as according to the process of the present invention, the single reactive components of the thin layer can be also different from those which constitute the filling polyurethane system, finished articles of manufacture can be produced, which are constituted by an inner, possible foamed, mass, obtained from cheap reaction products, which mass is coated by a thin, integrated skin obtained by starting from more valuable reactants.

Any organic polyisocyanates capable of yielding polyurethane resins and/or foams can be used in the practicing of the present invention, even if aliphatic, cycloaliphatic, aromatic polyisocyanates and their corresponding alkyl-substituted derivatives, are preferred.

In particular, low-molecular-weight diisocyanates having the general formula:

OCN—R—NCO     (I)

wherein:

R represents a possibly alkyl-substituted aliphatic, cycloaliphatic, aromatic radical of from 1 to 30 carbon atoms, can be used.

Among these, 2,2,4-trimethylhexamethylenediisocyanate, ethylidenediisocyanate, butylenediisocyanate, hexamethylenediisocyanate, cyclohexylene-1,4-diisocyanate, cyclohexylene-1,2-diisocyanate, dichlorohexamethylene diisocyanate, xylylenediisocyanate, meta- and/or para-phenylenediisocyanate 2,4-toluenediisocyanate either alone or in mixture with its 2,6-toluenediisocyanate isomer, 4,4'-diphenylmethanediisocyanate, possibly in mixture with its 2,4'-isomer, 4,4'-dicyclohexylmethanediisocyanate, 1-isocyanate-3-isocyanatemethyl-3,3,5-trimethylcyclohexane (i.e., isophoronediisocyanate), and so forth, can be mentioned.

The preferred diisocyanate falling within the scope of formula (I) is 2,4-toluenediisocyanate (TDI), either alone or in mixture with at least 20% by weight of 2,6-isomer, and 4,4'-diphenylmethanediisocyanate (MDI), either alone or in mixture with at least 5% by weight of 2,4'-isomer.

Non-distilled, i.e., raw toluenediisocyanate, i.e., a partially purified toluenediisocyanate drawn from a whatever tray of the distillation tower can be commonly used.

As alternative raw materials, medium- or high-molecular-weight polyisocyanates with various degrees of condensation, as obtained from the phosgenation of anilineformaldehyde condensates, can be used. These products are constituted by mixtures of polymethylene-polyphenyl-polyisocianates having the general formula:

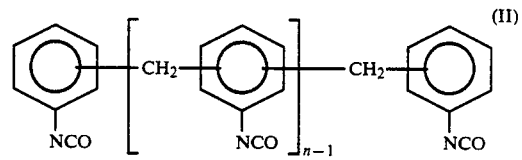

wherein $<n>$ means an integer equal to, or higher than, 1.

Preferred medium- or high-molecular-weight polyisocyanates are the mixtures of polymethylene-polyphenylene-polyisocyanates having an average functionality of 2.6-2.8; such products are marketed under various names, such as <Tedimon 31> available from Montedipe, <Suprasec DNR> available from ICI or <Desmodur 44 V20> available from Bayer.

Further examples of polyisocyanates which can be used in the process according to the present invention are the isocyanate prepolymers obtained from the reaction of polyisocyanates of formulae (I) and (II) with an understoichiometric number of equivalents of polyols, polyethers or polyester, with a hydroxy or amino functionality of at least 2, and an average molecular weight comprised within the range of from 500 to 8000.

The end-chain active hydrogen atoms containing compound is generally constituted by at least one polyol-polyether. Examples of polyol-polyethers are the low-molecular-weight compounds containing at least two active hydrogen atoms, such as glycols, triols, tetrols, amines, alkanolamines or mixtures thereof. Illustrative examples are dipropylene glycol, 1,4-butylene glycol, glycerol, trimethylol-propane, pentaerythritol, ethylene-diamine, triethanolamine, and so forth.

Further examples of polyol-polyethers are those compounds falling within this class of substances, having a high molecular weight, e.g., comprised within the range of from 500 to 8000, and preferably comprised within the range of from 3000 to 6000, with hydroxy or aminic functionality of at least 2, obtained from the condensation of mixtures of $C_2$-$C_5$ oxides on starter molecules containing at least two active hydrogen atoms, as those listed hereinabove. Preferred high-molecular-weight polyols are those which are obtained from ethylene oxide and/or propylene oxide.

The catalytic system contained in both the components of the thin skin layer and the components of the system capable of being converted into a cellular foam is constituted by aminic catalysts, such as triethylenediamine, and/or metal-based catalysts, such as tin-(II) octanoate.

Besides the above mentioned components, in the compositions of the thin skin layer and of the system capable of being converted into a cellular foam, further additives may be present such as, e.g., stabilizers, pigments, crosslinking agents, cell regulators, and so forth, the use of which is illustrated and described in literature, such as in Saunders and Frisch "Polyurethanes, Chemistry and Technology", Interscience, New York 1964.

In order to better understand the present invention and to practice it, some illustrative, non-limitative examples are reported in the following.

EXAMPLE 1

550 g of a pre-mixed polyuretanic system, having the composition detailed in the following, was charged to a mould heated at 45° C., installed on a rotational moulding machine. The mould reproduced a sphere of 22.5 cm of diameter.

| "A" Component: | |
|---|---|
| * Prepolymer from diphenylmethanediisocyanate (MDI) and polyol-polyether "Glendion 5964" and manufactured by Montedipe (NCO % = 19.5; viscosity at 26° C. = 400 mPa · s) | 65 pbw |
| "B" Component: | |
| * Polyol-polyether with m.w. 6000 "Glendion 5964" by Montedipe | 85.5 pbw |
| * Chain extender (monoethylene glycol) | 7.7 pbw |
| * Catalyst DABCO 33 LV (Air Product) | 0.3 pbw |
| * Zeolite | 4.3 pbw |
| (viscosity of "B" Component at 25° C.: 1,600 mPa · s) | |

(pbw = parts by weight)

After charging the mixture, with the temperature of 23° C., to the mould, the rotation of the latter has been started. The rotation movements were so programmed as to cause the main rotor and the secondary rotor to respectively rotate at 11 and 15 rpm.

After 1 minute and 30 seconds, the rotation was discontinued and 5 minutes later the mould was opened.

On the whole surface of the sphere, a layer of skin had been formed, which did not show surface defects.

The thickness thereof was uniform, and was comprised within the range of from 2.4 to 3.3 mm.

EXAMPLE 2

In order to reduce the thickness of the skin layer, a lower-viscosity system was used.

The composition of the system was as follows:

| "A" Component: | |
|---|---|
| * Pure MDI, modified with 25% by weight of urethaneimine PU ISO 9001 by Montedipe and manufactured by Montedipe (NCO % = 29.5; viscosity at 25° C. = 75 mPa · s) | 37 pbw |
| "B" Component: | |
| * Polyol-polyether with m.w. 6000 "Glendion 5964" by Montedipe | 90.2 pbw |
| * Chain extender (monoethylene glycol) | 6.3 pbw |
| * Catalyst DABCO 33 LV (Air Product) | 0.3 pbw |
| * Zeolite | 3.5 pbw |
| * Viscosity depressant (perchloroethylene) | 12.4 pbw |
| (viscosity of "B" Component at 25° C.: 800 mPa · s) | |

340 g of material was charged to the mould, and the revolution speeds of the rotors of the mould of Example 1 were respectively adjusted at 15 and 30 rpm. The rotation time was of 90 seconds. On the inner surface of the sphere a layer was formed, which did not show surface defects, and had an average thickness of 1.5 mm.

EXAMPLE 3

After coating the sphere with the skin by operating according to as reported in Example 2, the interior thereof was filled with a foamed polyurethane system.

With the mould being sealed, 5 minutes after stopping the rotor, 400 g was charged of material having the following composition:

| "A" Component: | |
|---|---|
| * Prepolymer from (MDI) and polyol-polyether "Glendion 5964" manufactured by Montedipe (NCO % = 28) | 60.5 pbw |
| "B" Component: | |
| * Polyol-polyether with m.w. 6000 "Glendion 5964" by Montedipe | 100.0 pbw |
| * Water | 3.1 pbw |
| * "SA" Catalyst (dibutyl-tin dilaurate) | 0.4 pbw |
| * Catalyst DABCO 33 LV (Air Product) | 1.0 pbw |
| * Silicone KS 43 (Bayer) | 3.5 pbw |
| * Algofrene 11 (Montefluos) | 10.0 pbw |

After 6 minutes of the introduction of the second material, the mould was opened.

The foam had completely filled the inner hollow of the sphere, had a density of 50 g/liter, and adhered to the skin without discontinuities.

We claim:

1. A process for preparing shaped bodies having an integrated polyurethane skin, which comprises the steps of:

a) charging to a hollow closed mold suitable for rotational molding, said mold having an inner surface, a first premixed reactive polyurethane system consisting essentially of at least one organic polyisocyanate, at least one compound containing end-chain active hydrogen atoms and a catalyst for polymerizing said polyisocyanate and said active hydrogen compound, b) rotating said mold at room temperature and for a time in the range of from 90 to 300 seconds to form a thin layer of partially polymerized polyurethane on said inner surface of said mold, wherein said partially polymerized polyurethane comprises reactive chemical groups, and c) discontinuing said rotating and charging into said hollow mold a premixed polyurethane reactive system containing carbon dioxide developed in situ as the foaming agent, which reacts with said partially polymerized polyurethane on said inner surface of said mold, said premixed polyurethane reactive system being converted into a cellular foam.

2. The process of claim 1, wherein said thin layer of partially polymerized polyurethane has a thickness of less than 10 mm.

3. The process of claim 1, wherein said thin layer of partially polymerized polyurethane has a thickness in the range of 0.3–3.5 mm.

4. The process of claim 1, wherein said rotating is conducted at 10–50 rpm.

5. The process of claim 1, wherein said reactive polyurethane system has an initial viscosity less than 5,000 mPa.s.

6. The process of claim 1, wherein said reactive polyurethane system has an initial viscosity of from 50 to 1,000 mPa.s.

* * * * *